US012374820B2

(12) United States Patent
Zhao

(10) Patent No.: US 12,374,820 B2
(45) Date of Patent: Jul. 29, 2025

(54) ELECTRICAL CONNECTOR HAVING AN INSULATIVE SHELL WITH A MOLD HOLE

(71) Applicants: Fuyu Electronic Technology (Huai'an) Co., Ltd., Huai'an (CN); FOXCONN INTERCONNECT TECHNOLOGY LIMITED, Grand Cayman (KY)

(72) Inventor: Jun Zhao, Huaian (CN)

(73) Assignees: Fuyu Electronic Technology (Huai'an) Co., Ltd., Huai'an (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 398 days.

(21) Appl. No.: 18/150,313

(22) Filed: Jan. 5, 2023

(65) Prior Publication Data

US 2023/0216229 A1 Jul. 6, 2023

(30) Foreign Application Priority Data

Jan. 6, 2022 (CN) ......................... 202220017652.6

(51) Int. Cl.

*H01R 13/40* (2006.01)
*H01R 13/405* (2006.01)
*H01R 13/52* (2006.01)
*H01R 24/62* (2011.01)

(52) U.S. Cl.

CPC ....... *H01R 13/405* (2013.01); *H01R 13/5216* (2013.01); *H01R 24/62* (2013.01)

(58) Field of Classification Search

CPC .................................................... H01R 13/405
USPC ......................................... 439/587, 589, 936
See application file for complete search history.

(56) References Cited

U.S. PATENT DOCUMENTS 3,643,208 A * 2/1972 Massa, Jr. ............ H01R 13/523 439/387
7,217,157 B2 * 5/2007 Onoda ............... H01R 13/5216 439/589

* cited by examiner

*Primary Examiner* — Phuong K Dinh
(74) *Attorney, Agent, or Firm* — Ming Chieh Chang

(57) ABSTRACT

An electrical connector includes: an insulative housing having a base and a tongue forwardly extending from the base; plural conductive terminals insert-molded with the insulative housing; an insulative shell enclosing the insulative housing and having a top wall, a bottom wall opposite to the top wall, a pair of side walls connecting the top wall and the bottom wall, and a glue filling chamber formed at a rear side thereof; a metal reinforcement being insert-molded with the bottom wall of the insulative shell for mounting on an external circuit board; and a fluidal type waterproofing glue being injected into the glue filling chamber to form a waterproof rubber plate, wherein the bottom wall of the insulative shell is provided with a mold hole that runs through a rear end surface thereof and the mold hole is blocked from the glue filling chamber in a vertical direction.

9 Claims, 9 Drawing Sheets

ELECTRICAL CONNECTOR HAVING AN INSULATIVE SHELL WITH A MOLD HOLE

BACKGROUND OF THE INVENTION

Field of the Invention

The present invention relates to a reliable waterproof electrical connector with an improved mold hole.

Description of Related Arts

A common electrical connector generally includes an insulative housing, a plurality of conductive terminals retained in the housing, an insulative shell surrounding the insulative housing, and a metal reinforcement insert-molded to a bottom wall of the insulative shell for securing to an external circuit board. The insulative shell includes a glue filling chamber for forming a cured waterproof rubber plate and a mold hole is arranged to extend vertically through the glue filling chamber and open backward in order for a molding tool to hold the metal reinforcement stable during insert-molding operation. However, the fluid communication between the mold hole and the glue filling chamber will prevent the fluidal type waterproofing glue from filling the mold hole such that the waterproof rubber plate may not be tightly combined with the glue filling chamber, thus affecting the waterproof performance of the electrical connector.

SUMMARY OF THE INVENTION

An electrical connector comprises: an insulative housing having a base and a tongue forwardly extending from the base in a front-to-back direction; a plurality of conductive terminals being insert-molded with the insulative housing; an insulative shell enclosing the insulative housing and the conductive terminals, the insulative shell having a top wall, a bottom wall opposite to the top wall in a vertical direction perpendicular to the front-to-back direction, a pair of side walls connecting the top wall and the bottom wall, and a glue filling chamber formed at a rear side thereof; a metal reinforcement being insert-molded with the bottom wall of the insulative shell for mounting on an external circuit board; and fluidal type waterproofing glue being injected into the glue filling chamber to form a waterproof rubber plate, wherein the bottom wall of the insulative shell is provided with a mold hole that runs through a rear end surface thereof and the mold hole is blocked from the glue filling chamber in the vertical direction.

DETAILED DESCRIPTION OF THE DRAWINGS

Figure 1:
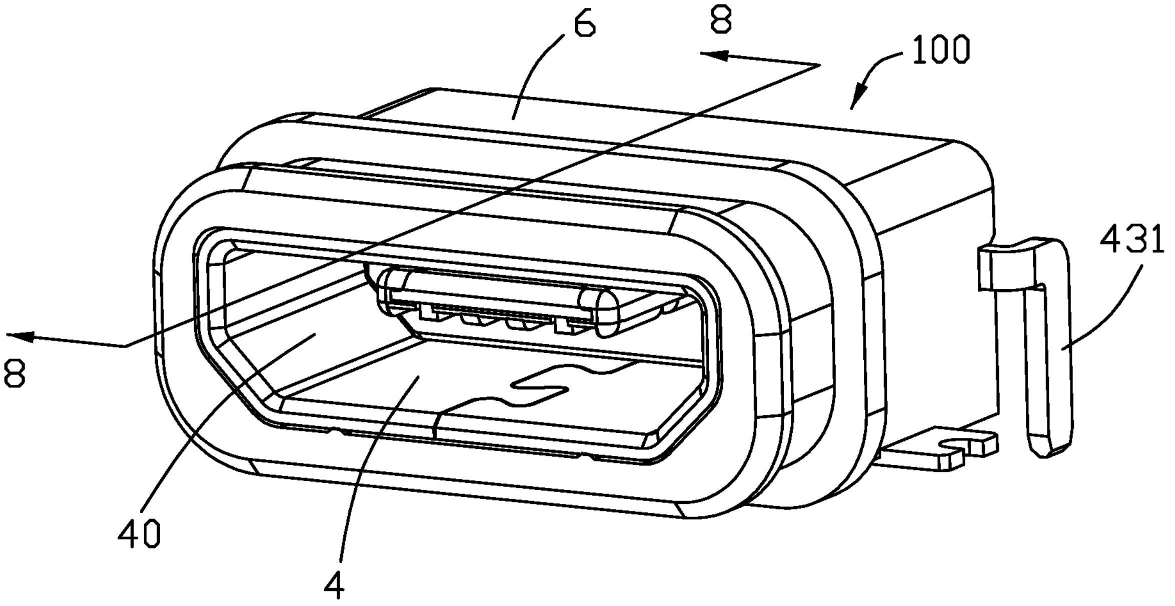
FIG. 1 is a perspective view of an electrical connector in accordance with the present invention.
Figure 2:
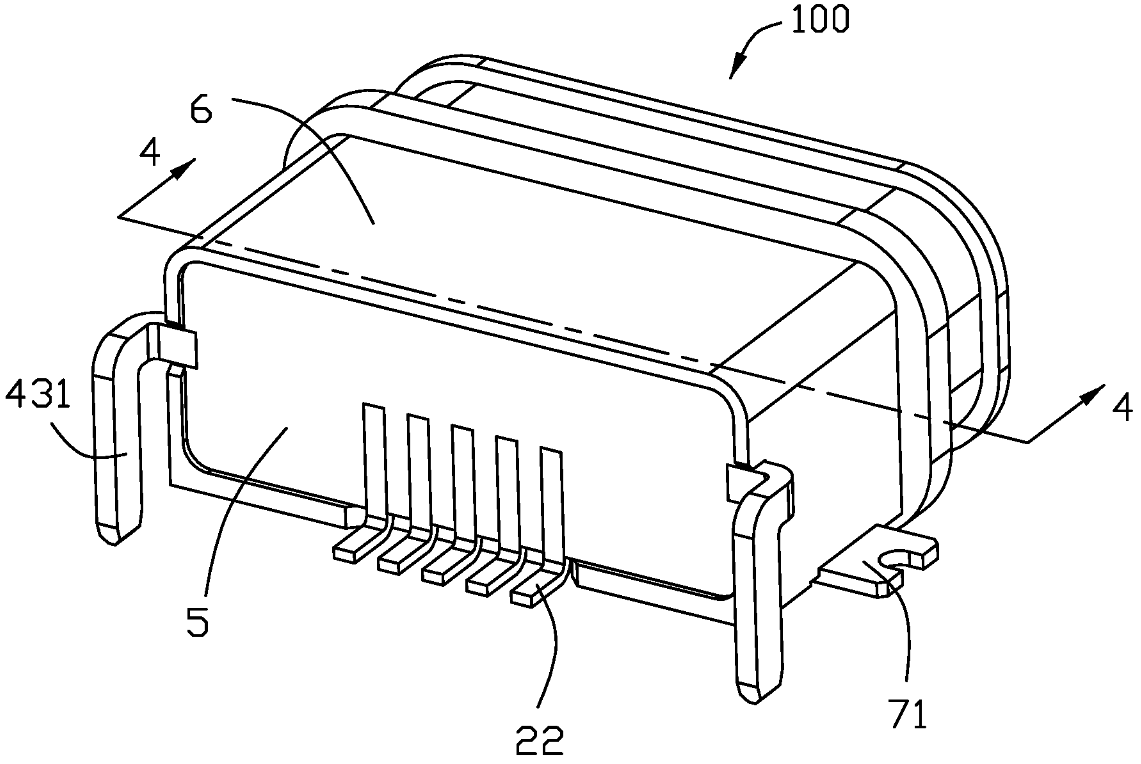
FIG. 2 is another perspective view of the electrical connector of FIG. 1.
Figure 3:
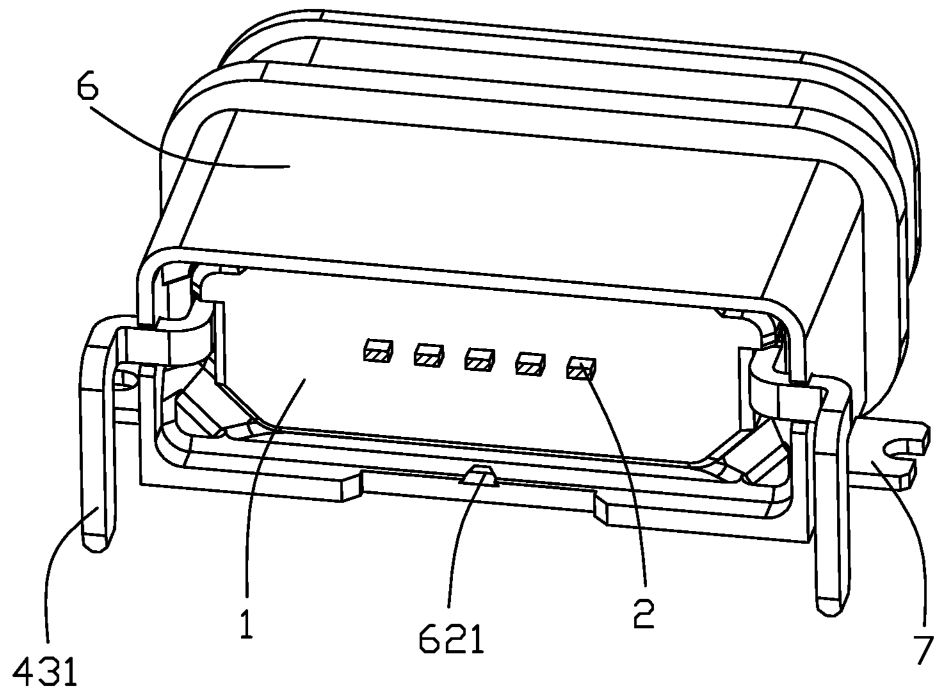
FIG. 3 is a perspective view of removing the waterproof rubber plate of FIG. 2.
Figure 4:
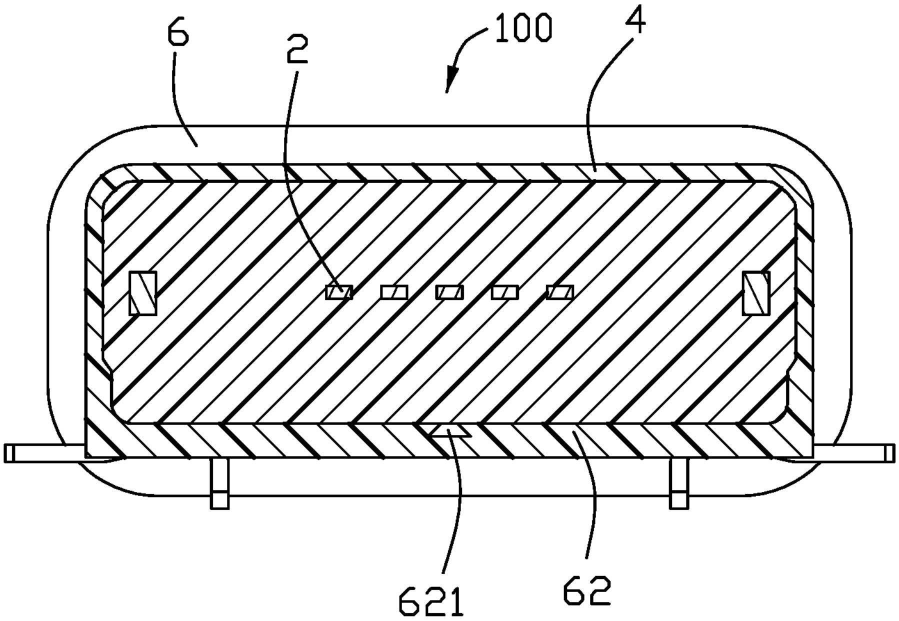
FIG. 4 is a cross-sectional view of the electrical connector of FIG. 2.
Figure 5:
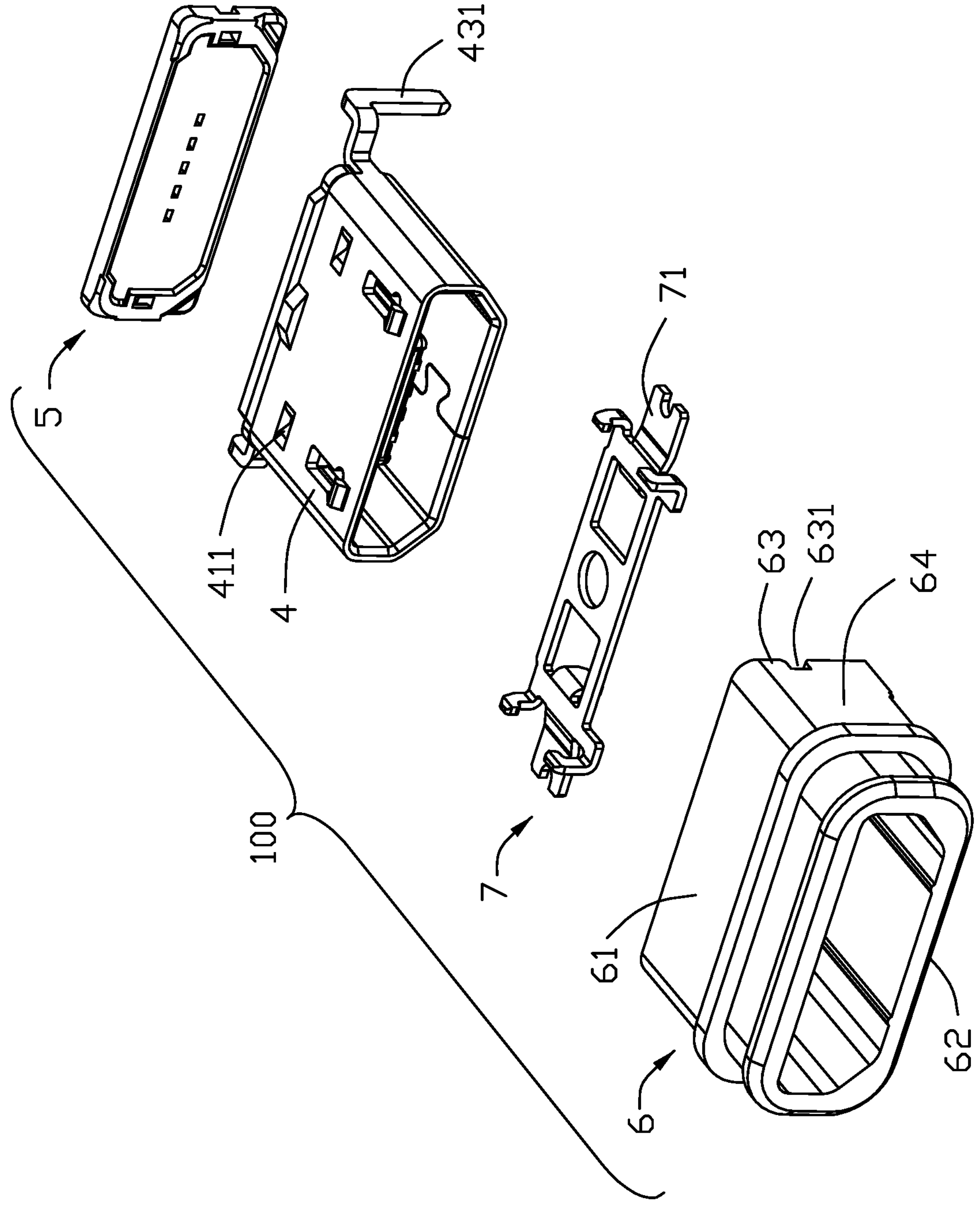
FIG. 5 is an exploded perspective view of the electrical connector.
Figure 6:
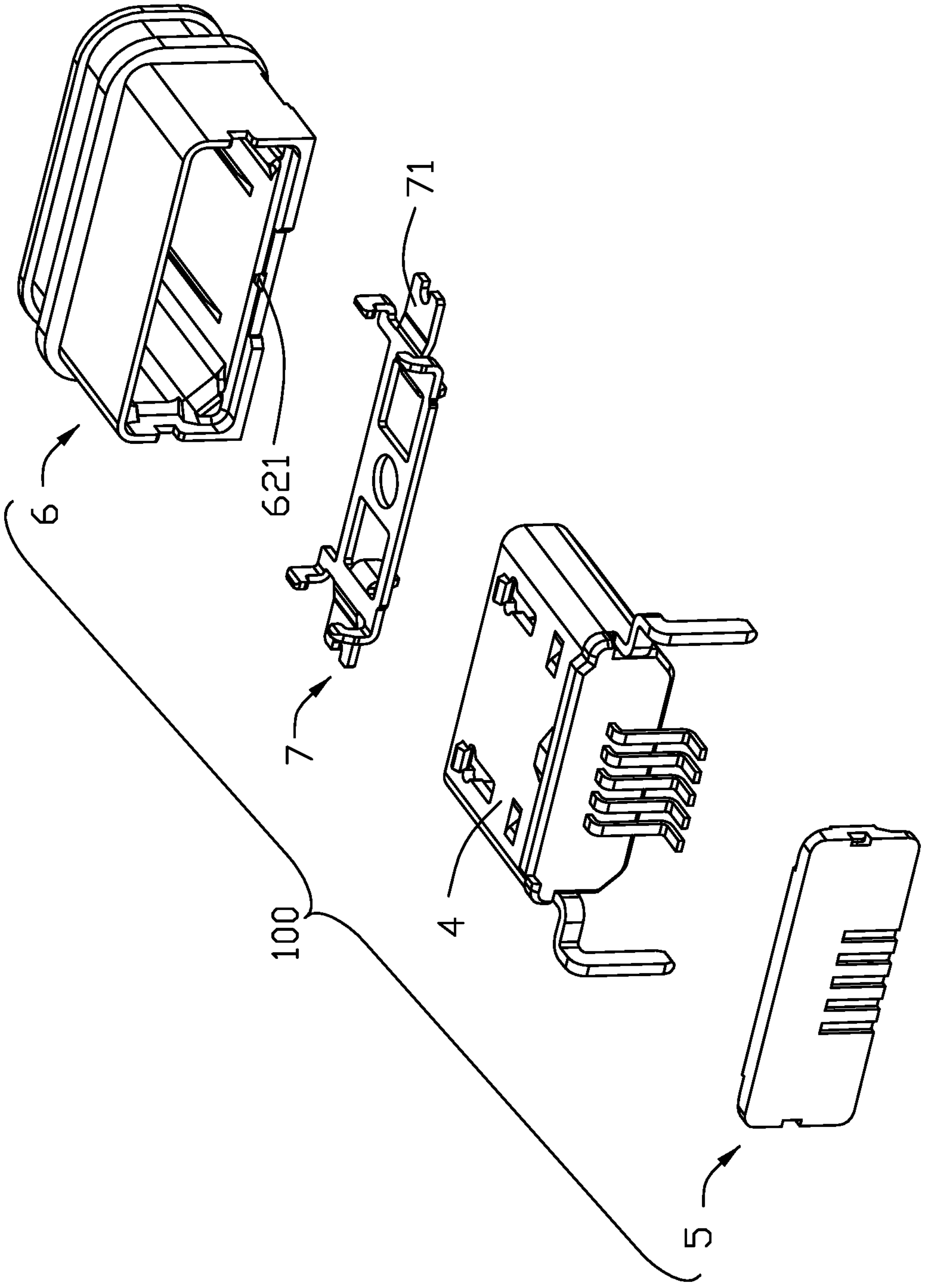
FIG. 6 is another exploded perspective view of the electrical connector of FIG. 5.

Referring to FIGS. 1-9, an electrical connector 100 includes a insulative housing 1 having a base 11 and a tongue 12, a plurality of conductive terminals 2 and an metal plate 3 retained in the insulative housing and exposed, respectively, to a lower and an upper faces of the tongue 12, a metal shell 4 receiving the insulative housing 1 and the conductive terminals 2, an insulative shell 6 enclosing the metal shell 4, and a metal reinforcement 7 retained in the insulative shell 6 via an insert-molding process. The electrical connector 100 further comprise a waterproof rubber plate 5 sealed at a rear end of the electrical connector 100.

The insulative housing 1 includes a base 11 and a tongue 12 extending forward from the base 11 in a front-to-back direction. The base 11 includes a abutting groove 111 concavely disposed at a front end of the base 11 and a stopper 112 disposed at a rear end of the base 11, The stopper 112 protrudes upward from the outer peripheral surface of the base 11. Each conductive terminal 2 includes a contacting portion 21 exposed to the lower face of the tongue 12, a soldering portion 22 extending rearward out of the base 11, and a connecting portion 23 connecting the contacting portion 21 and the soldering portion 22.

Figure 7:
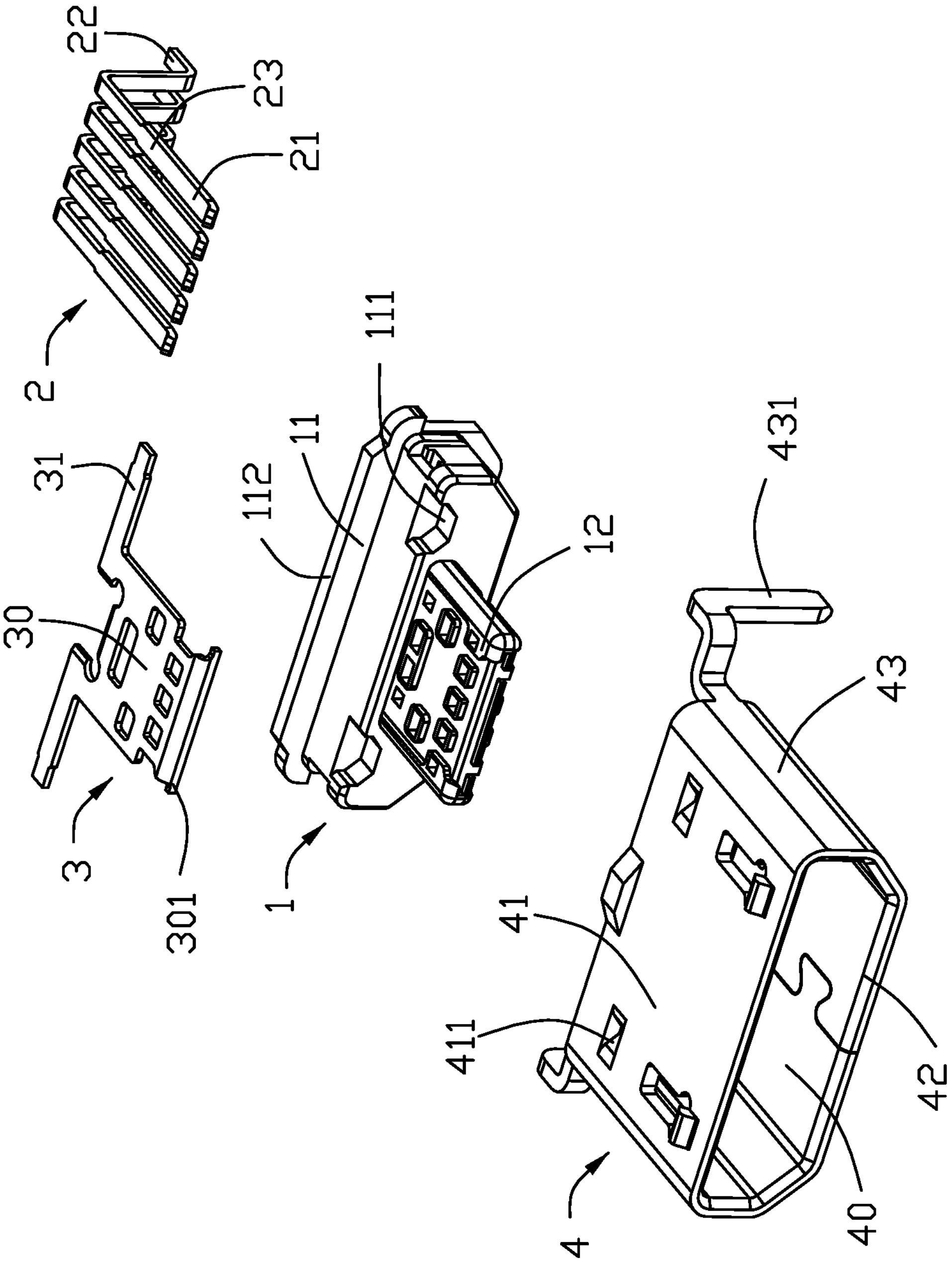
FIG. 7 is a partial perspective exploded view of the electrical connector in FIG. 5.

Referring to FIG. 7, the metal plate 3 includes a main body 30 retaining in the insulative housing 1, a bending portion 301 extending downward from a front end of the main body 30, and a pair of soldering tails 31 extending from both sides of the rear end of the main body 30. The pair of soldering tails 31 are extend out of both side surfaces of the insulative housing 1.

The metal shell 4 has a cylindrical shape and includes an upper wall 41, a lower wall 42 opposite to the upper wall 41 in the vertical direction perpendicular to the front-to-back direction, and a pair of side walls 43 connecting the upper wall 41 and the lower wall 42. The upper wall 41, the lower wall 42 and the side wall 43 enclose a receiving chamber for receiving the insulative housing 1 and the conductive terminals 2. The upper wall 41 is provided with a resisting portion 411, and the resisting portion 411 abuts against the abutting groove 111 to limit the forward movement of the insulative housing 1. The metal shell 4 includes a pair of grounding tails 431 extending from a rear end of the side wall 43, and the metal shell 4 is soldered to an external circuit board through the grounding tail 431 to realize the ground shielding function.

The insulative shell 6 covers the metal shell 4 includes a top wall 61, a bottom wall 62 and a pair of side walls 63 connecting the top wall 61 and the bottom wall 62. The metal reinforcement 7 is retained in the bottom wall 62 of the insulative shell 6, and the metal reinforcement 7 is used for reliably installing the electrical connector 100 on the external circuit board. The rear surface of the bottom wall 62 is formed with a mold hole 621 for inserting an external mold, and the external mold presses the metal reinforcement 7 for insert molding the insulative shell 6 on the metal reinforcement. The rear end of the insulative shell 6 is formed with a glue filling chamber 65 located at front side of the mold hole 621, and the waterproof rubber plate 5 is formed by injecting fluidal glue into the glue filling chamber 65. The purpose of the waterproof rubber plate 5 is to seal the gap between the insulative housing 1 and the insulative shell 6. In prior art, a mold hole is usually arranged vertically through the glue filling chamber and opens backward, which makes it impossible for the fluidal glue to fill the mold hole after being injected into the glue filling chamber, so that the waterproof rubber plate cannot be reliably combined with the inner wall of the glue filling chamber, and then, the waterproof of the electrical connector fails.

Figure 8:
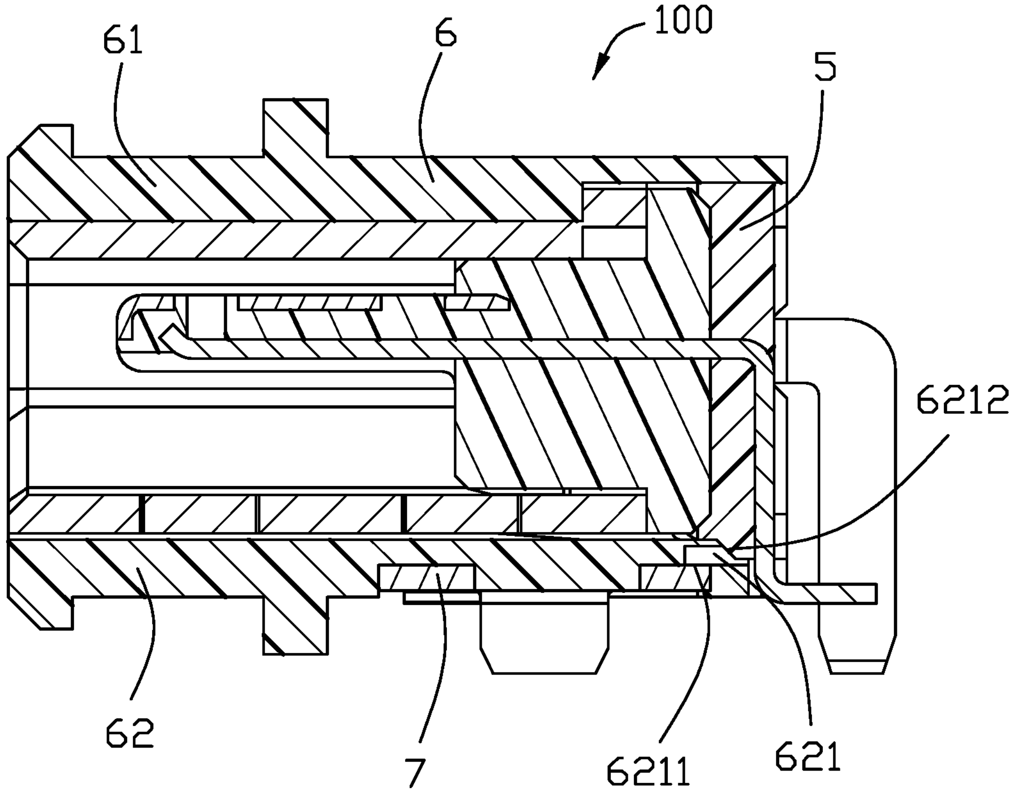
FIG. 8 is a cross-sectional view of the electrical connector of FIG. 1.
Figure 9:
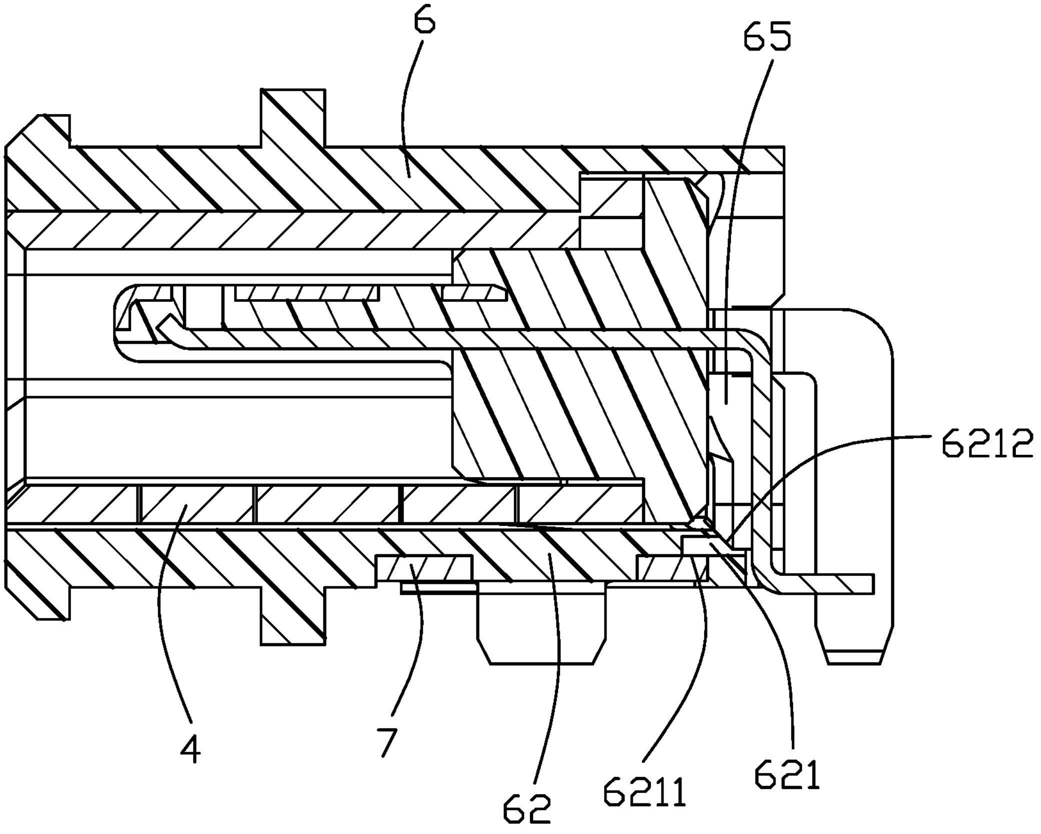
FIG. 9 is a view similar to FIG. 8 with a waterproof rubber of the electrical connector removed.

In this embodiment, the mold hole 621 only runs through a rear surface of the bottom wall 62 and does not communicate with the glue filling chamber in the vertical direction. In other words, the mold hole 621 is disposed within the thickness range of the bottom wall 62 and does not penetrate through the bottom wall 62 in the vertical direction. The mole hole 621 includes a first opening 6211 and a second opening 6212 located at a rear side of the first opening 6211. As shown in FIGS. 8 and 9, the front side of the first opening 6211 is blocked by the insulating material of the bottom wall 62, a part of the lower side of the first opening 6211 is blocked by the metal reinforcement 7 and the other part is blocked by the insulating material of the bottom wall 62. Regardless of whether there is fluid glue in the mold hole 621, the waterproof rubber plate 5 can be reliably sealed in the glue filling chamber 65.

The second opening 6212 is arranged obliquely, and forms a dovetail groove structure in the vertical direction. When the waterproof rubber plate 5 is filled and formed in the mold hole 621, a relatively stable structure can be formed through the second port 6212.

The rear surface of the side wall 63 is recessed forward to form a notch 631, and the grounding tail 431 of the metal housing 4 is clamped in the notch 631 and extends outward and downward to realize grounding. The metal reinforcement 7 also has a pair of soldering plates 71 on both sides for soldering to the external circuit board.

The invention claimed is:

1. An electrical connector comprising:

an insulative housing having a base and a tongue forwardly extending from the base in a front-to-back direction;

a plurality of conductive terminals being insert-molded with the insulative housing;

an insulative shell enclosing the insulative housing and the conductive terminals, the insulative shell having a top wall, a bottom wall opposite to the top wall in a vertical direction perpendicular to the front-to-back direction, a pair of side walls connecting the top wall and the bottom wall, and a glue filling chamber formed at a rear end thereof;

a metal reinforcement being insert-molded with the bottom wall of the insulative shell for mounting on an external circuit board; and a fluidal type waterproofing glue being injected into the glue filling chamber to form a waterproof rubber plate;

wherein the bottom wall of the insulative shell is provided with a mold hole that runs through a rear end surface thereof and the mold hole is blocked from the glue filling chamber in the vertical direction.

2. The electrical connector as claimed in claim 1, wherein the mold hole is located at a rear side of the glue filling chamber.

3. The electrical connector as claimed in claim 2, wherein the mold hole includes a first opening and a second opening located behind the first opening, a front side and an upper side of the first opening being blocked by a portion of the bottom wall.

4. The electrical connector as claimed in claim 3, wherein the mold hole is disposed within a wall thickness range of the bottom wall, and a bottom side of the first opening is blocked by the metal reinforcement.

5. The electrical connector as claimed in claim 1, further including a metal shell surrounding the insulative housing, and wherein the metal shell is covered by the insulative shell, and the metal shell is located in front of the glue filling chamber and the mold hole.

6. The electrical connector as claimed in claim 5, wherein the metal shell includes an upper wall, a lower wall opposite to the upper wall in the vertical direction, and a pair of side walls connecting the upper wall and the lower wall, a rear surface of each of the pair of side walls is recessed forward to form a notch, each of side wall of the metal shell is provided with a soldering tail clamped in the notch for soldering to the external circuit board.

7. The electrical connector as claimed in claim 1, further including a metal plate fixed to the insulative housing to strengthen the insulative housing.

8. The electrical connector as claimed in claim 7, wherein the metal plate and the conductive terminal are respectively exposed on two opposite surfaces of the tongue.

9. The electrical connector as claimed in claim 1, wherein the fluidal type waterproofing glue is further filled in the mold hole to form the waterproof rubber plate.

* * * * *